United States Patent [19]
Pohl

[11] Patent Number: 4,767,176
[45] Date of Patent: Aug. 30, 1988

[54] DEVICE FOR FIXING FIBER-SHAPED LIGHT WAVEGUIDES IN A PLUG HOUSING

[75] Inventor: Peter Pohl, Stockdorf, Fed. Rep. of Germany

[73] Assignee: Siemens Aktiengesellschaft, Berlin and Munich, Fed. Rep. of Germany

[21] Appl. No.: 85,203

[22] Filed: Aug. 17, 1987

[30] Foreign Application Priority Data

Aug. 18, 1986 [DE] Fed. Rep. of Germany ....... 8622121

[51] Int. Cl.⁴ ............................ G02B 6/36; G02B 7/26
[52] U.S. Cl. ............................... 350/96.20; 350/96.22; 350/96.23
[58] Field of Search ............... 350/96.10, 96.20, 96.22, 350/96.23

[56] References Cited

U.S. PATENT DOCUMENTS

| | | | |
|---|---|---|---|
| 4,519,672 | 5/1985 | Rogstadius | 350/96.20 |
| 4,533,209 | 8/1985 | Segerson et al. | 350/96.20 |
| 4,593,970 | 6/1986 | Rhodes | 350/96.20 |
| 4,595,254 | 6/1986 | Gentric | 350/96.20 |
| 4,605,280 | 8/1986 | Welber | 350/96.23 |
| 4,634,216 | 1/1987 | Calevo | 350/96.20 |

Primary Examiner—William L. Sikes
Assistant Examiner—Robert E. Wise
Attorney, Agent, or Firm—Hill, Van Santen, Steadman & Simpson

[57] ABSTRACT

A device for securing fiber-shaped light waveguides in a lead-through opening of a housing comprises a fixing member of elastic deformable material which is inserted into the through-opening. The fixing member has at least one channel for loosely receiving the light waveguide and is provided with a recess, either in the interior of the member or between an outer periphery of the member and an edge of the opening in which a stopper member is inserted to cause elastic deformation of the fixing member so that the channels grip the optical waveguides.

15 Claims, 2 Drawing Sheets

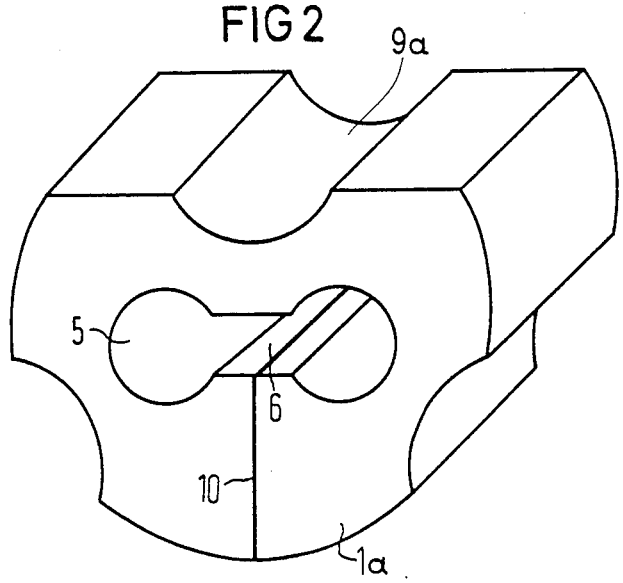
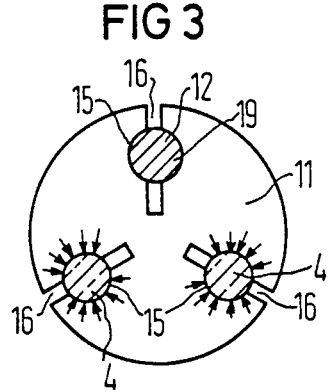
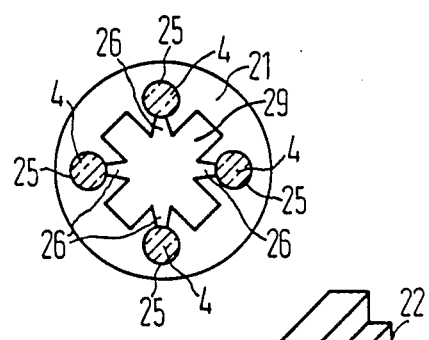
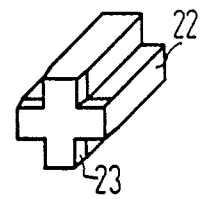

DEVICE FOR FIXING FIBER-SHAPED LIGHT WAVEGUIDES IN A PLUG HOUSING

BACKGROUND OF THE INVENTION

The present invention is directed to a mechanism or device for securing fiber-shaped light waveguides in a plug housing, which device comprises a lead-through opening for conducting at least one light waveguide through the device and into a housing.

Various apparatus for securing light waveguides in an opening of a housing are known. For example, these light waveguides can be secured in a housing by gluing, however, such a procedure requires a long curing time.

SUMMARY OF THE INVENTION

It is an object of the present invention to create a mechanism or device for securing fiber-shaped light waveguides in a plug housing, which device can be manipulated in an uncomplicated fashion.

These objects are obtained in a device for fixing or securing fiber-shaped light waveguides in a plug housing which has a lead-through opening for conducting at least one light waveguide into the housing. The device comprises a fixing member of elastic deformable material having a channel for loosely receiving each of the light waveguides and being movable on said light waveguides, said fixing member being insertable in a lead-through opening in an essentially tension-free manner, a recess being provided in the region of the fixing member and extending parallel to the running direction of at least one of the light waveguides, and a stopper composed of essentially inelastic material being pressed in the recess to elastically deform the fixing member into tight engagement on each waveguide received therein.

In this way, the light waveguide is advantageously first connected to the fixing member in a lead-through opening in a non-positive fashion. The connection between the fixing member and the lead-through opening occurs first by pressing the stopper or stopper member into a recess.

In an expedient embodiment, the recess is provided between an inside wall of the lead-through opening of the housing and the fixing member and that the fixing member has two cylindrical channels interconnected by a slot or groove to form a dumbell-shaped cross section for the acceptance of the light waveguides. This shape guarantees an approximately uniform distribution of the fixing forces onto the circumference of each of the waveguides in the two channels.

In another embodiment, the recess for the acceptance of the stopper member is provided in the fixing member and the fixing member comprises at least two channels in the region between the center and the outside limitations, and one of these channels forms the recess for this stopper.

On the basis of a suitable dismensioning of the channels and/or of the stopper, an optional employment of the channel for the acceptance of the light waveguide or, respectively, of the stopper, is thereby advantageously possible.

In a specific embodiment, the recess for the acceptance of the stopper is provided in the center of the fixing member.

In another expedient embodiment, the fixing member is provided with a slot extending in from a periphery into one of the channels so that the member can be open-like. As a result of this structure, the fixing member can be applied to a light waveguide at any arbitrary location, for example, when no free end of the fiber-shaped light waveguide is present. In this embodiment, the fixing member is prevented from re-opening after insertion into the lead-through opening. It then behaves like a one-piece fixing member.

Other advantages and features of the invention will be readily apparent from the following drawings, the description of the preferred embodiments and claims.

BRIEF DESCRIPTION OF THE DRAWINGS

FIG. 2 is a perspective view of an embodiment of the fixing member of FIG. 1;

FIG. 3 is an end view with portions in cross section for purposes of illustration of another embodiment of a fixing member in accordance with the present invention;

FIG. 4 is an end view of a still further embodiment of the fixing member in accordance with the present invention; and FIG. 5 is a perspective view of a stopper used with the embodiment of the fixing member of FIG. 4.

DESCRIPTION OF THE PREFERRED EMBODIMENTS

Figure 1:
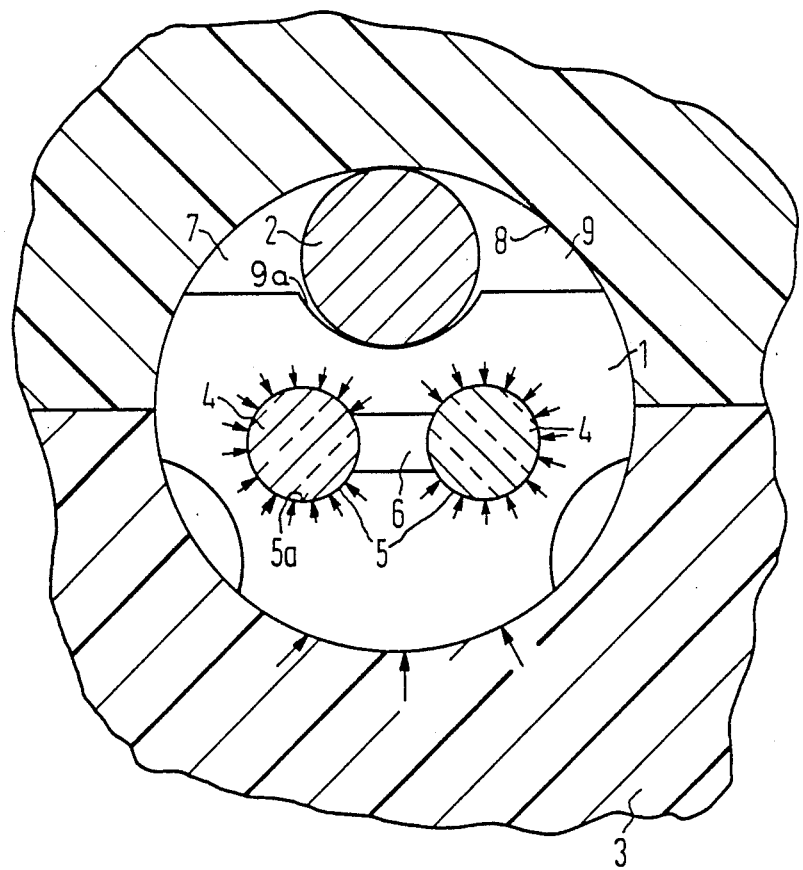
FIG. 1 is an end view of a fixing member in accordance with the present invention with portions in cross section for purposes of illustration.

The principles of the present invention are particularly useful when incorporated in a fixing member or fixing part 1, as illustrated in FIG. 1. The fixing member 1 is inserted in a lead-through opening 7 in a housing wall 3, for example a plug connector housing. The fixing member 1, as illustrated, has two channels 5, which are interconnected by transverse gap or slot 6, and the two channels 5 receive fiber-shaped light waveguides 4, which are enveloped by a plastic layer (not shown).

The fixing member 1, preferably, is constructed of an elastic plastic and in an unstressed, relaxed condition has channels 5 which loosely receive each of the waveguides 4 so that the waveguides can be loosely displaceable in the channel, even as the member 1 is inserted into a through-opening 7 of the housing wall 3. The light waveguides 4 are, thereby, still slightly mobile so that the light waveguides can still be adjusted in the longitudinal direction without any force exertion which is harmful to the light waveguide being applied to the waveguide. The insertion of the fixing part into the lead-through opening 7 can occur by inserting the fixing part in an axial insertion into the lead-through opening when the housing wall 3 is a one-piece member. When, as illustrated in FIG. 1, the housing wall 3 is divided in the region of the lead-through opening 7, then the portions of the housing wall can be opened to allow the insertion of the fixing member 1 and then the portions of the housing wall are then moved back together to engage the fixing member in the opening 7.

As illustrated in FIG. 1, a recess 9 is present between an inside surface or edge 8 of the opening 7 and an outer surface of the fixing member 1 which has a depression 9a. The recess 9 and the depression 9a extend parallel to the running direction of the light waveguides 4 and a stopper 2 is then inserted into the recess 8. The stopper 2 is composed of an essentially inelastic material and has dimensions so that upon insertion of the stopper member 2, the elastic material of the fixing part is deformed in such a fashion that a transverse slot 6 connecting the channels 5 is dimished and the channel inside walls 5a of the fixing part press against the light waveguides 4 with a force radially distributed on the light waveguide, as indicated by the arrows. A fast and reliable fastening of the light waveguide 4 with defined forces occur in this way.

By removing the stopper 2, the light waveguide 4 becomes freely mobile again, for example, when it is necessary to again correct the length of the free end of one of the light waveguides. In this embodiment, it should be noted that a stopper 2 can have a tapering configuration to facilitate the insertion into the recess 9.

An embodiment of the fixing member is illustrated by the fixing member 1a of FIG. 2. This embodiment has a parting seam 10, which extends from an outside surface of the member 1a into the region of the gap 6 between the two channels 5. This parting seam 10 allows the fixing member 1a to be hinged or opened so that the light waveguides need no longer be threaded through the channels 5 with their ends. Thus, the fixing member can be snapped over the light waveguide at any arbitrary location. In this way, the attachment of the fixing member to the light waveguide is also advantageously possible, even after the ends have been fitted with plug connectors or other elements.

Another embodiment of the fixing member is shown by the member 11 in FIG. 3. This fixing member has three channels 15 arranged offset relative to one another by an angle of 120°, and these channels each have an expanding slot 16. The slots 16 extend from the periphery radially inward toward the center and divide the fixing part into three segments, which are interconnected only at the center. Optionally two of these channels 15 can each accept a light waveguide. While a stopper 12 is inserted into the third channel which forms a recess 19. As a result thereof, the slot 16 of the third channel 15 which forms a recess 19 will be expanded, and this will lead to a constriction of the other two slots and also cause a gripping of the waveguide 4 in each of the other two channels 15.

Yet another embodiment of the fixing member is shown by the fixing member 21 of FIG. 4. The fixing member 21 has four channels 25, which are each expanded by a slot 26 on one side for receiving four light waveguides. These channels 25 and their slots 26 are arranged offset at an angle of 90° relative to one another with the channels 26 leading into a central cross-shaped recess or opening 29. A stopper 22 (FIG. 5) likewise has a cross-shaped profile and is inserted into the recess 29. In order to facilitate the insertion, the stopper 22 comprises a conically or tapering introduction region 23 at one end. As a result thereof, with the insertion of the stopper or plug 22, each of the slots 26 becomes constricted and, thus, the waveguides are grippingly engaged in their respective channels 25.

Although various minor modifications may be suggested by those versed in the art, it should be understood that I wish to embody within the scope of the patent granted hereon all such modifications as reasonably and properly come within the scope of my contribution to the art.

I claim:

1. A device for securing fiber-shaped light waveguides in a plug housing which housing has a lead-through opening for conducting at least one light waveguide through, said device comprising a fixing member of elastic deformable material being provided with at least one channel for loosely receiving at least one light waveguide, said fixing member being insertable in the lead-through opening in a substantially relaxed condition, a recess being provided in the region of the fixing member extending parallel to the running direction of the light waveguide in the channel, and a stopper member composed of essentially an inelastic material being insertable in the recess to elastically deform the fixing member to cause each of the channels to grippingly engage the optical waveguide disposed therein.

2. A device according to claim 1, wherein the recess is provided between an outer surface of the fixing member and an inside edge of the lead-through opening.

3. A device according to claim 2, wherein the fixing member has two channels for receiving two light waveguides, said channels being interconnected by a transverse extending gap.

4. A device according to claim 3, wherein the fixing member on a surface opposite the recess has a parting seam extending into the region of the transverse gap so that the fixing member can be snapped onto each of the light waveguides being received in said two channels.

5. A device according to claim 1, wherein the recess for the acceptance of the stopper member is provided in the fixing member.

6. A device according to claim 5, wherein the fixing member comprises at least two channels in the region between the center and an outside limitation and one of these channels forms the recess for the stopper.

7. A device according to claim 5, wherein the recess for the acceptance of the stopper is provided in the center of the fixing member and each of the channels for the optical waveguides is disposed in a region between the recess and the outer periphery of said member.

8. A device according to claim 1, wherein the fixing member has a parting seam extending into a region of a channel for the waveguide so that the member can be snapped onto the waveguide.

9. A device according to claim 1, wherein the fixing member has a cylindrical configuration with at least two radially inwardly extending slots dividing the member into segments, each of said slots having a channel spaced radially inward from the periphery of the member, one of said channels forming a recess for the stopper member and each of the remaining channels receiving the light waveguides.

10. A device according to claim 9, wherein the member has three radial slots, each with a channel, two of said channels receiving waveguides and the third channel forming the recess for the stopper member.

11. A device according to claim 1, wherein the fixing member has a cylindrical periphery, said recess being disposed in the center of said fixing member, each of said channels being positioned between the recess and the cylindrical periphery of the member and having a slot extending into the recess so that when the stopper member is inserted into the recess, each slot and its respective channel is constricted.

12. A device according to claim 11, wherein the center recess has a configuration of a cross and said stopper member has a cross-shaped cross section corresponding to the shape of the recess.

13. A device according to claim 12, wherein the fixing member has four channels with a slot, said slots extending from the channels into the cross-shaped recess.

14. A device according to claim 1, wherein the fixing member has arcuate portions for engaging edges of the through-opening of the housing, said fixing member having an outer surface with a depression, said depression coacting with an edge of the through-opening of the housing to form the recess for receiving the stopper member, said fixing member having two channels for two waveguides, said two channels being interconnected by a transverse slot extending between the two channels.

15. A device according to claim 14, which includes a parting seam extending from said slot to an outer periphery of the member opposite said depression so that the member can be opened to allow snapping onto the waveguides.

* * * * *